Jan. 19, 1965  J. T. SULLIVAN, JR  3,166,072
BARBED CLIPS
Filed Oct. 22, 1962

INVENTOR.
JOHN T. SULLIVAN JR.
BY

ATTORNEY

United States Patent Office 3,166,072
Patented Jan. 19, 1965

3,166,072
BARBED CLIPS
John T. Sullivan, Jr., 2040 W. Wisconsin Ave.,
Milwaukee, Wis.
Filed Oct. 22, 1962, Ser. No. 232,174
9 Claims. (Cl. 128—334)

This invention relates to the art of surgical anastomosis and is particularly concerned with improvements which simplify and shorten the time required for the technique.

Clinical results following suture anastomosis have been excellent. However, one objection, is the considerable amount of time required to perform the tedious, yet exacting, sewing procedures, which often occur in deep, hard to reach anatomical locations. This alone markedly contributes to the total operating time, which in turn prolongs the anesthesia and can add to the patient's postoperative morbidity. Thus, there is a need for a simple, safe, fast and inexpensive method for a nonsuture anastomosis technique.

The importance of this technique becomes evident when considering that today nearly all anastomosis of tissues is performed by sewing with two layers of various suture materials. Suture technique has been established for many years with little or no change in basic principles.

The present invention provides a nonsuture technique and has for its purpose the providing of a simple and rapid technique for anastomosing ends or sides of bowel, blood vessels and other tubular structures and also the edges of peritoneum, facia, skin and other flat structures, which may or may not be viable, all through use of certain clip structures, which will be described in detail.

Other and further purposes of my invention will become more apparent as the description proceeds, when taken in conjunction with the accompanying drawings, in which:

FIGURE 1 is an enlarged perspective view of a barbed clip constructed of plastic material or the like;

Figure 1:
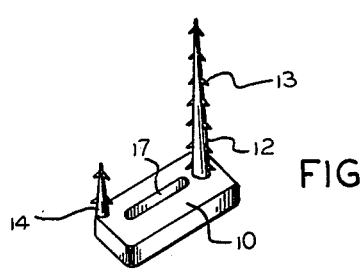
Figure 3:
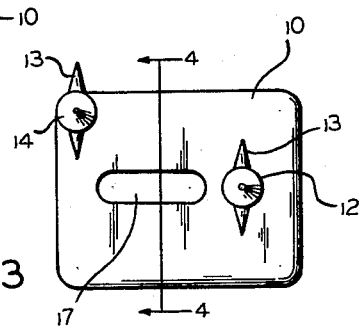
FIGURE 3 is a plan or top view of the clip shown in FIGURES 1 and 2.
Figure 2:
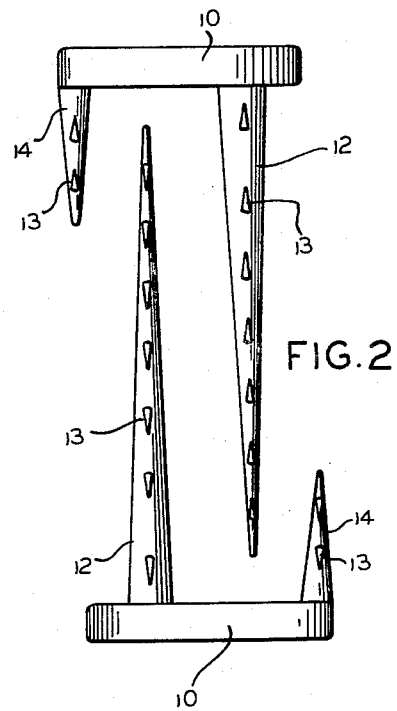
FIGURE 2 is a composite cross sectional view of a pair of clips in their relation to one another when being applied.
Figure 4:
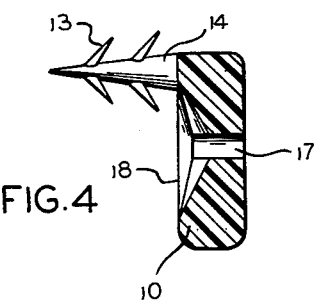
FIGURE 4 is a cross sectional view of a barbed clip shown in FIGURE 3, taken at the section line 4—4 therein.

By referring to FIGURE 1, the clip is made by injection molding of nonreactive, tissue inert plastic, such as is commercially known as polyethelene. The back plate 10 of the clip measures approximately 4 x 3 x 1 millimeters. All corners and edges are rounded and smooth. The material used in the construction of this unit is of a rigid consistency, but not brittle.

From a point approximately 0.5 mm. away from the longitudinal end of the plate 10, a rigid barbed spike 12 protrudes at right angles to the back plate 10, and measures approximately 7 mm. in length. Spike 12 is positioned on the longitudinal axis of plate 10. This spike 12 has a generally circular cross section and is tapered to a point; its base is approximately 0.5 mm. in diameter. From the shaft of the tapered round spike 12, two rows of barbs 13 protrude, which extends generally transversely to the longitudinal axis of the back plate 10. Barbs 13 are set at approximately a 45° angle to the axis of the spike 12 and point generally downwardly or toward the base of the spike 12 and the back plate 10. The barbs 13 are approximately 0.5 mm. in length, 0.2 mm. in diameter at their base where they are attached to the shaft of the spike and are tapered to a sharp point. The barbs 13 are also constructed of semi-rigid material as in the base plate 10 so that they can be compressed backward in the direction of the back plate and parallel to the shaft of the tapered spike. (See FIGURE 7.)

From the other end of the back plate 10, is a similar, but shorter, spike 14, similar in all measurements and provided with similiar barbs, with the exception that it measures approximately 2 mm. in length and is located in the upper corner of the back plate 10.

In the center of the back plate 10, between the spikes 12 and 14, is a slot 17 extending parallel to the longitudinal axis of the back plate 10, while measuring 2.5 mm. in length and 0.7 mm. in width. This entire slot 17 is slightly beveled on its front side 18, which is that side of the plate 10 which carries spikes 12 and 14.

Figure 8:
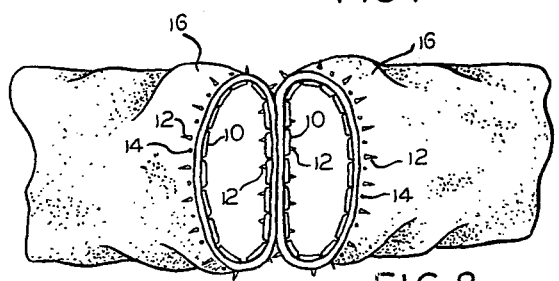
FIGURE 8 is a perspective view showing the ends of a pair of tubular structures with the clips applied when anastomosing the ends of tubular structures.

The clips constituting the invention are intended for use in pairs. They may be adherently mounted on a tape shown as 15. (See FIGURES 5 and 6.) Opposed groups of clips must be present on the opposite body tissue structures 16 in order to properly anastomose the two structures together. (See FIGURE 8.) Each opposing pair of clips will function in an identical manner. A single clip is placed with its long axis parallel to the edge of the structure 16 to be anastomosed and both the short spike 14 and the long spike 12 are inserted through the structure or tissue. If the edges of the two structures 16 to be joined are to be inverted, the clip is placed on the inside of said structure; if the edges are to be everted, the clip is placed on the outside of the structure.

A second clip is placed in a similar manner on the second structure or tissue to be joined, opposite or facing the first clip, but with its long spike 12 in a reverse position, that is facing the opposite short spike 14. Thus the position of the second clip must be in a reverse position to that of the first, so that the long spikes 12 are not directly opposite and in alignment with one another.

Figure 7:
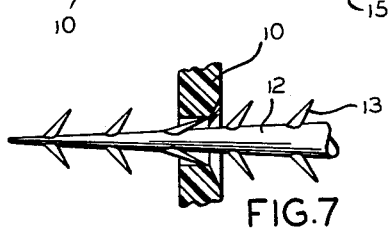
FIGURE 7 is a fragmentary cross section of a portion of a clip with a barbed spike inserted therein.

Both clips with each "set" of spikes inserted through their respective tissues are now turned inward (for inversion of the tissue edges); this will place the external aspect of the tissues to be joined in opposition. By pressing the two clips together, each long barbed spike 12 enters the tissue opposite to it, and then penetrates the slot 17 of the opposite back plate 10, impinging the two layers of tissue. As the barbs 13 of the spikes 12 make their exit through the slot 17 of the opposite back plate 10, they resume or "spring back" toward their natural 45° angle, and locate outside or external to the slot 17 in the plastic back plate 10. (See FIGURE 7). Those barbs within the 1 mm. thickness of the back plate 10 oppose separating forces by virtue of the frictional engagement with the walls of the slots as is seen in FIGURE 7.

The function of the short barbed spikes 14 is not to impinge in the opposite plastic back plate 10, but serves solely as a second fixation point (the first being the long spike 12), in order to prevent rotation of each clip upon the long spike 12 before said clip is engaged to its opposite mate.

Figure 5:
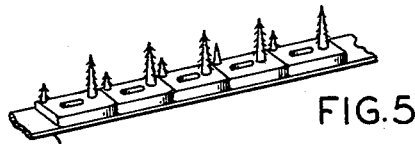
FIGURE 5 is a perspective view of the clips applied to a holding tape.
Figure 6:
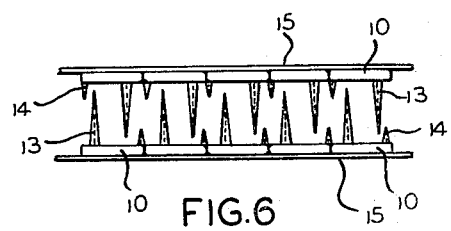
FIGURE 6 is a composite view of the clips applied to tapes and spaced in proper opposite relation to one another.

By referring to FIGURES 5 and 6, it will be noted that the free backs of the ovoid clips are mounted end-to-end and touching each other, the long spike 12 adjacent to the short spike 14 of the next clip on a strip of "pressure sensitive tape" shown as 15. This tape 15 is of a type which will stand sterilization by autoclaving at 250° F. at 20 pounds pressure for 20 minutes.

The strip of tape 15 with the clips mounted thereon are prepared in convenient lengths, somewhat longer than the circumference or flat length of structures 16 intended for anastomosis. One end of the tape 15 may be colored, as for example, that end having a short spike adjacent thereto. Similar tape strips with the clips mounted thereon as described above are prepared in the same length, each containing the same number of clips. However, the other ends of some of the tapes are colored, as for example, the ends having a long spike adjacent thereto. This procedure facilitates placement of each clip in the correct position to its mate, i.e. the long spike 12 of one clip is opposite to the short spike 14 of the opposite clip. All strips are prepared in the same manner except some strips (after the clips have been mounted), are turned around and the head end is colored. Thus the correct positioning of each pair of clips may be obtained by merely placing the colored tips of pairs of tapes opposite to each other. These tape strips with the clips mounted thereon are prepared before sterilization. Once the strips are prepared and sterilized, they may be stored for immediate use.

All anastomosis using paired clips as herein described are "open" anastomsis and cannot be performed using a "closed aseptic" technique. An example of a typical end-to-end bowel anastomosis is as follows:

The desired segment of diseased bowel is resected, following accepted principles of bowel surgery. Approximately 4 to 5 mm. of mesentary is freed from each end of the open segments and hemostasis secured. Rubber shod intestinal clamps are conventionally placed to prevent any leakage of fecal material during the anastomosis. If crushing clamps have been applied at the site of the resection, these areas must be excised, so that fresh bowel ends containing no devitalized tissue remain for anastomosing. The lumens of each end should have a reasonably similar diameter; if not, the smaller lumen should be enlarged either by performing a greater oblique re-resection of the bowel end having the smaller lumen (the mesenteric border edge always being longer, or making an appropriate longitudinal incision at the antimesenteric edge). The details of these techniques are basic to bowel surgery and are assumed to be well known by the operating surgeon.

The barbed clips are inserted first into the bowel end having the smaller diameter. A tape strip containing mounted clips is inserted on the inside cut margin of the bowel (mucosal side) with the colored end of the tape placed at the antimensenteric border. The barbed spikes are inserted through the entire thickness of the bowel (starting from the mucosa and exciting from the serosa). The tape strip should be flush with the cut edge of the bowel wall, or slightly within said edge, but never protruding beyond it. Each successive clip, by means of its barbed spikes 12 and 14, is attached to the entire circumference of the bowel end, proceeding in either a clockwise direction, or in a counterclockwise direction. The last clip to be attached should touch the clip first inserted, which is at the colored end of the tape. No area in the circumference of the bowel should be without a clip. Excess tape containing mounted clips should be cut off at a point immediately adjacent to the color marked end tape. The remaining length of excess tape is placed along side of a second tape strip (the non-colored end), and this exact length is cut off from the end of the latter (or second tape). This will result in the exact number of clips on the second tape that have been inserted on the first tape.

The identical procedure should then be repeated on the other end of the bowel that is to be anastomosed. At this point it is extremely important that the second tape be placed along the same direction as was the first tape. This will allow the correct alignment of each pair of clips so that a long spike 12 will be in opposition to the short spike 14 of its mate. For this reason, it is advised that the direction used when placing the tape strips be the same for each anastomosis, thus developing a "direction habit" regarding clockwise or counter clockwise technique.

When both bowel ends have been prepared as outlined above, both adhesive tape strips are removed leaving the clips in place, each being a separate unattached unit, but touching each other (See FIGURES 5 and 6). Starting at the antimesenteric border, a pair of opposing clips are turned on their sides so that the full thickness of bowel wall which is impinged on the clips is turned inward, or inverted; the long spikes 12 are then facing their mates' back plate 10, which is covered and hidden by a full thickness of bowel wall. The long spikes 12 are maneuvered so that they are in a straight line parallel to the bowel edges and about 2 mm. apart. Compression of the two clips together will cause the long spikes 12 to pierce the opposite bowel wall and into the slot 17 in the back plate 10 of the opposite clip, thereby firmly impinging the two bowel walls between said clips. The barbs 13 will prevent the withdrawal of the long spikes 12 and hold opposed clips together.

Each opposed pair of clips are so locked, proceeding in a direction away from the operator until the last pair (adjacent to the first pair), are joined. When engaging the last two or three pair of clips, compression should be only partial until all are loosely locked; this will allow direct visual alignment. Final firm compression can be performed blindly through the outer bowel wall. Mesenteric defects are then repaired in a routine manner using suture techniques.

From the above description it will be seen that a tubular round anastomosis can be quickly and securely accomplished.

The narrow width of each clip results in a small reduction of the diameter of the bowl's lumen atthe anastomosis site.

New blood supply and resulting healing of the anastomosis occur at the serosal junction through inversion of the bowel edges. This is well accomplished when using the clip technique, yet undue pressure from the clips at the point of serosal healing is avoided because the edges of the clips are rounded and smooth.

Locked clips cannot become separated because of the barbs on the spikes. Sloughing of the inverted bowel edge is quite possible in time but individual clip pairs can be passed freely with feces. Permanent retention within the bowel lumen can produce little foreign body reaction because of the non-reactive material of the clips.

Whereas I have shown and described an operative form of the invention, it should be understood that this showing and description thereof should be taken in an illustrative or diagrammatic sense only. There are many modifications in and to the invention which will fall within the scope and spirit thereof and which will be apparent to those skilled in the art. The scope of the invention should be limited only by the scope of the hereinafter appended claims.

I claim:

1. A joining clip for anastomosis of body tissue and the like including a substantially flat base, said base having a long spike and a short spike extending from one surface thereof, said spikes having substantially rectilinear axes, each of said spikes having barbs extending outwardly from the axis thereof, said short spike having a length sufficient to penetrate a thickness of body tissue, said long spike having a length exceeding that of the short spike by an amount at least equal to the thickness of the base, whereby the long spikes of an opposed pair of clips may penetrate the base of an opposed clip without penetration of the base by the short spike.

2. The structure of claim 1 wherein said base is formed from semirigid plastic material permitting penetration by the long spike of an opposed clip.

3. The structure of claim 1 wherein said base has an aperture therein for penetration by the long spike of an opposed clip.

4. The structure of claim 1 wherein said base has a slotted opening therein, said opening having a width greater than the width of said long spike but less than the combined dimension of the width of said long spike and the extension of the barbs therefrom.

5. A joining clip for anastomosis of body tissue and the like including a substantially flat base, said base having a long spike and a short spike extending from one surface thereof, said base having an aperture therein and in longitudinal alignment with said long spike, said short spike having a length sufficient to penetrate a thickness of body tissue, said long spike having a length exceeding that of the short spike by an amount at least equal to the thickness of the base, whereby the long spikes of an opposed pair of clips may penetrate the aperture of the base of an opposed clip without penetration of the base by the short spike, said long spike having projecting means for providing a holding engagement within the aperture of said opposed clip.

6. A joining assembly for anastomosis of body tissue and the like including an elongated pressure sensitive adhesive coated tape, said tape having identical clips positioned thereon in end to end relation, each clip including a substantially flat base having an aperture therein, each said base having a spike extending outwardly from one surface thereof, said spike extending generally perpendicular to said surface, said spikes and apertures of said clips being longitudinally aligned with respect to said elongated tape, whereby plural clips may be joined to one another by passing said spikes of some of said clips through the apertures of other clips, said long spike having projecting means for providing a holding engagement within the aperture of said opposed clip.

7. The assembly of claim 6 wherein each clip includes additional spike means on said one surface and formed and adapted for penetration of tissue held between the clips.

8. The assembly of claim 6 wherein the aperture of each clip is elongated in a direction parallel to the length of said tape.

9. A joining assembly for anastomosis of body tissue and the like including an elongated pressure sensitive adhesive coated tape, said tape having identical clips positioned thereon in end to end relation, each clip including a substantially flat base having an aperture therein, each said base having a spike extending outwardly from one surface thereof, said spike extending generally perpendicular to said surface, an additional spike projecting from said surface but spaced from said spike and aperture, said spikes and apertures forming rows extending generally parallel to the length of said tape, said first-named spike having projecting means for providing a holding engagement within the aperture of opposed clips whereby the clips carried by said tape may be joined to clips of a similarly formed tape by passage of said first-named spikes throughout apertures of similar clips on said other tape.

References Cited in the file of this patent

UNITED STATES PATENTS

| 1,255,477 | Smart | Feb. 5, 1918 |
| 3,068,869 | Shelden et al. | Dec. 18, 1962 |

FOREIGN PATENTS

| 2,597 | Great Britain | 1903 |
| 36,595 | Netherlands | Oct. 15, 1935 |
| 121,533 | Russia | Oct. 9, 1951 |
| 1,170,424 | France | Sept. 28, 1958 |